Figure 1:
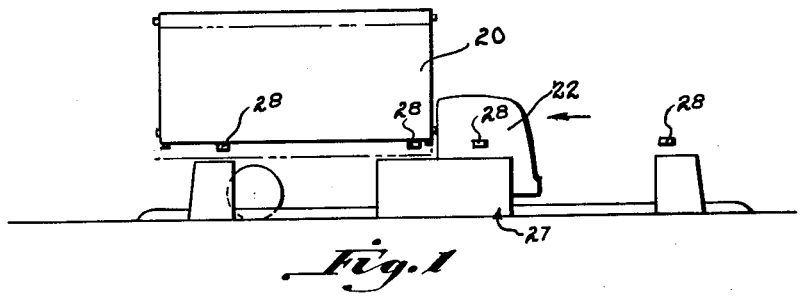
Figure 2:
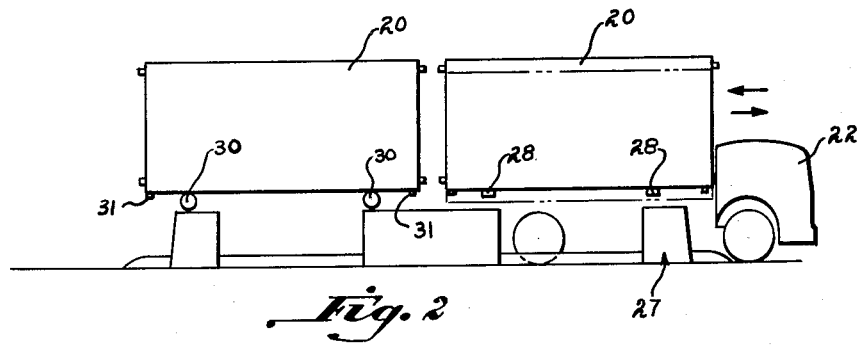

April 3, 1962  J. J. BLACK  3,028,024
APPARATUS FOR POSITIONING CARGO BODIES
Filed Nov. 10, 1958  4 Sheets-Sheet 2

INVENTOR.
James J. Black.
By Wood, Herron & Evans.
ATTORNEYS.

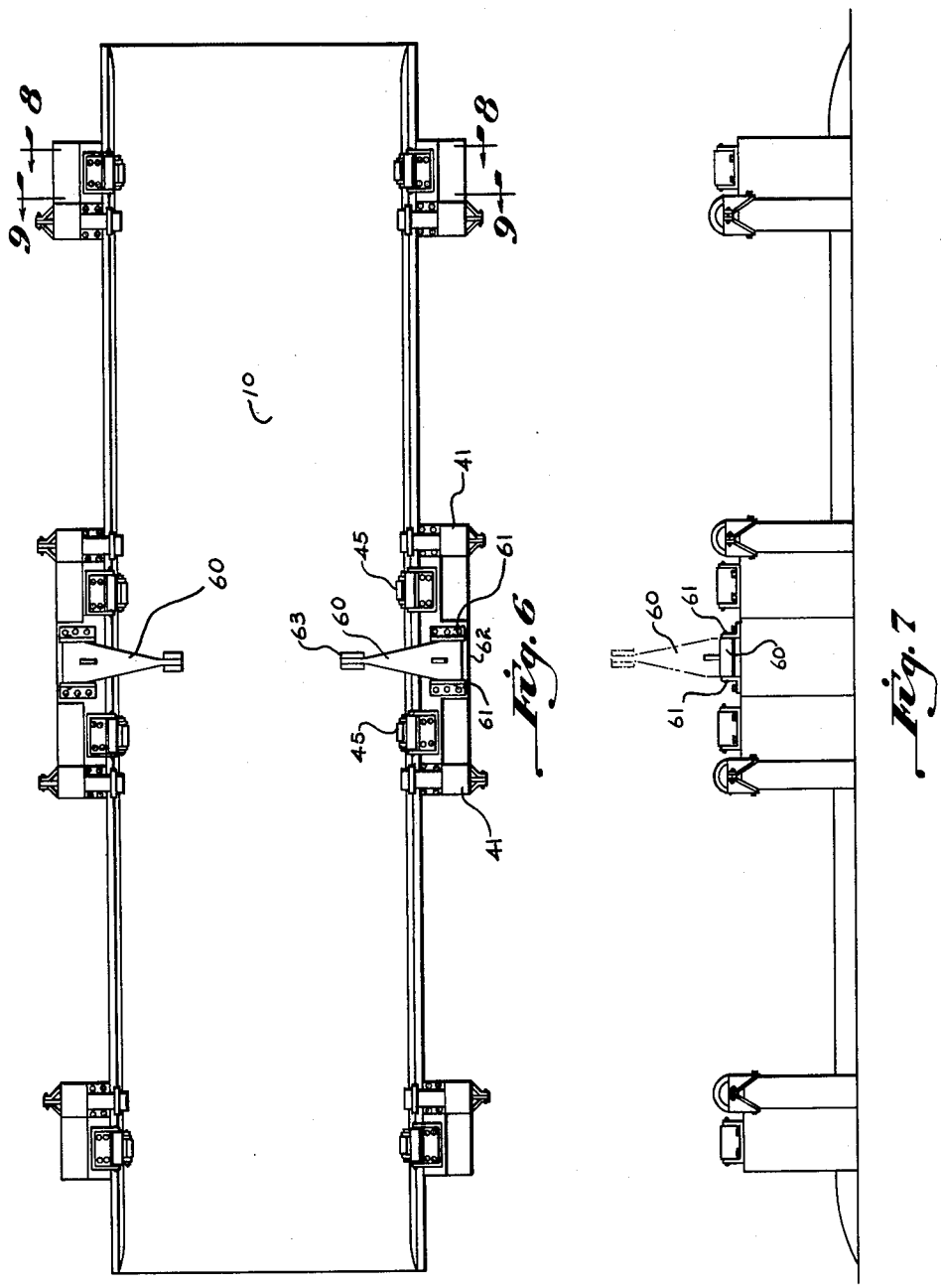

April 3, 1962 J. J. BLACK 3,028,024
APPARATUS FOR POSITIONING CARGO BODIES
Filed Nov. 10, 1958 4 Sheets-Sheet 4

INVENTOR.
James J. Black
Wood, Herron & Evans,
ATTORNEYS.

United States Patent Office 3,028,024
Patented Apr. 3, 1962

3,028,024
APPARATUS FOR POSITIONING CARGO BODIES
James J. Black, Cincinnati, Ohio, assignor to Trailmobile Inc., Cincinnati, Ohio, a corporation of Delaware
Filed Nov. 10, 1958, Ser. No. 772,986
5 Claims. (Cl. 214—38)

This invention relates to apparatus and method for handling cargo bodies. More particularly this invention relates to the shifting of cargo bodies from at least two trucks and accurately positioning the cargo bodies on a tractor drawn semi-trailer.

It is generally acknowledged that the most efficient road vehicle for long distance hauling is the tractor drawn semi-trailer. Recent developments in the art of transporting articles of commerce have provided methods and apparatus which will still further increase the efficiency of transportation by eliminating much of the intermediate loading and unloading of cargo bodies which heretofore has attended the transportation and distribution of articles of commerce. Such an arrangement is embodied in my co-pending application for "Method and Apparatus for Handling Cargo Bodies," Serial No. 770,639, filed October 30, 1958, now abandoned.

Such designs utilize separable cargo bodies which are adapted to be transported on trucks for distribution but which are shiftable therefrom to a semi-trailer so that they may be hauled in groups of two, three or more over long distances. The use of complete, but separable cargo bodies has eliminated much intermediate handling. In this respect these new proposals have proved satisfactory.

It is possible further to increase the efficiency of long distance hauling utilizing such recently developed systems and apparatus, by reducing the tare weight of a semi-trailer through the employment of a lightweight chassis for the support of the separable cargo bodies. More specifically, a lightweight chassis which normally would not be capable of supporting loaded cargo bodies if used in a conventional manner is rendered fully effective for service by utilization of the cargo bodies themselves for structural support. The necessary structural support from the cargo bodies is obtained by rigidly joining adjacent cargo bodies together so that they constitute a beam supported principally at the rear axle and fifth wheel of the semi-trailer. Thus any bending moment which normally would have to be resisted by the semi-trailer chassis would, in accordance with my invention, be resisted by the unitary cargo body structure.

It has been an objective of the invention to provide a lightweight chassis for semi-trailers combined with plural, rigidly connected, support providing cargo bodies.

It has been another objective of the invention to provide means for interconnecting separable cargo bodies to form a beam supported principally at the rear axle and fifth wheel of a semi-trailer.

It has been another objective of the invention to provide apparatus for shifting cargo bodies individually from trucks and to dispose plural cargo bodies on a semi-trailer chassis.

It has been another objective of the invention to provide means for removing a plurality of cargo bodies individually from truck chassis, to center and align the cargo bodies so that they may be rigidly joined together as a unitary cargo body and thereafter disposed on a semi-trailer chassis.

It has been still another objective of the invention to provide means for lifting a cargo body from a truck chassis and means for projecting rollers into engagement with the under surface of the cargo body to center the cargo body and to permit the cargo body to be rolled in a longitudinal direction.

Figure 10:
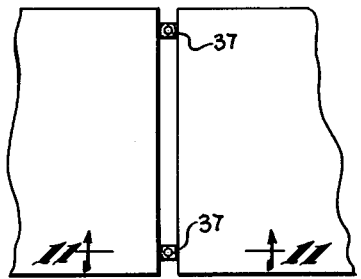
Figure 11:
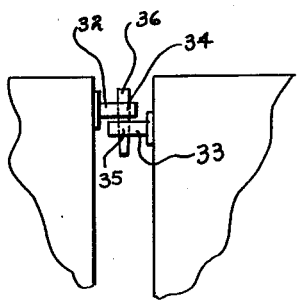
Figure 8:
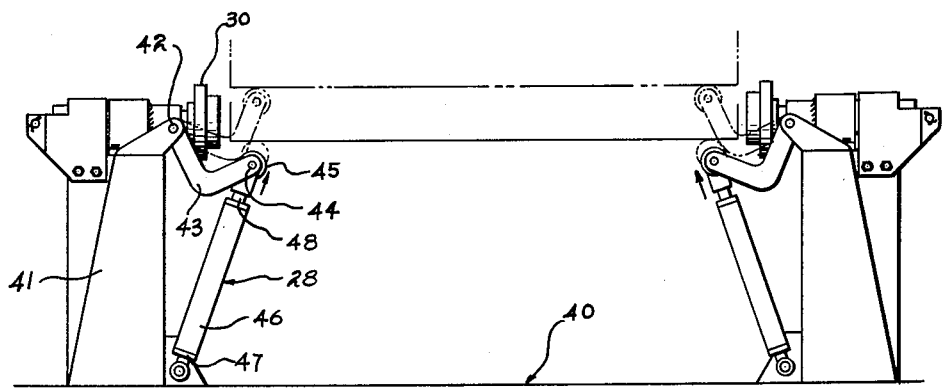
Figure 9:
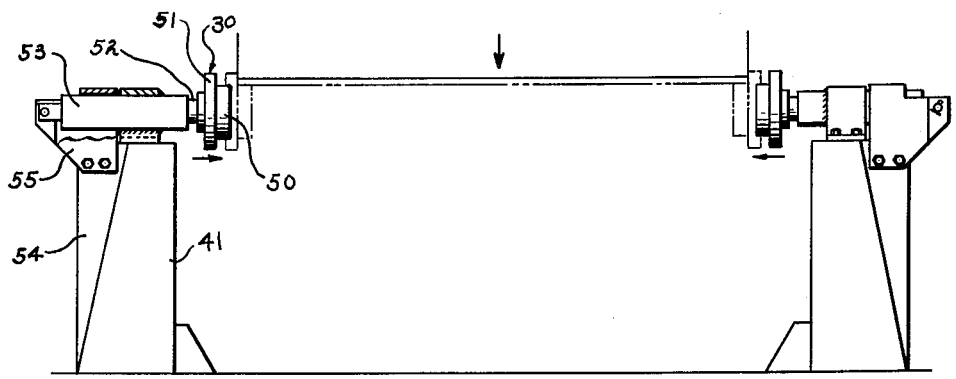

These and other objectives of the invention will become more readily apparent from the following description taken in conjunction with the accompanying drawings in which:

FIGS. 1 to 5 are diagrammatic side elevational views illustrating the operation of the invention;
FIG. 6 is a top plan view of the cargo body handling apparatus;
FIG. 7 is a side elevational view thereof;
FIG. 8 is an end elevational view thereof taken along lines 8—8 of FIG. 6;
FIG. 9 is an end elevational view thereof taken along lines 9—9 of FIG. 6;
FIG. 10 is a fragmentary top plan view of a cargo body structure taken along lines 10—10 of FIG. 5; and
FIG. 11 is a cross sectional view taken along lines 11—11 of FIG. 10.

Figure 3:
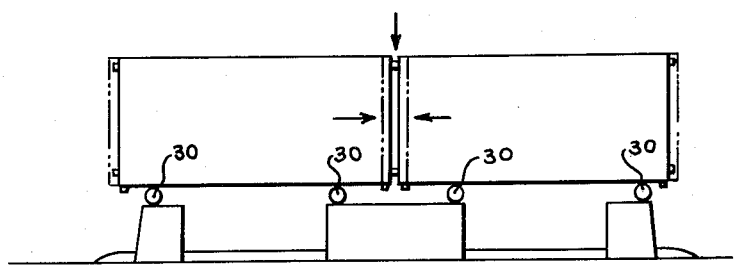
Figure 4:
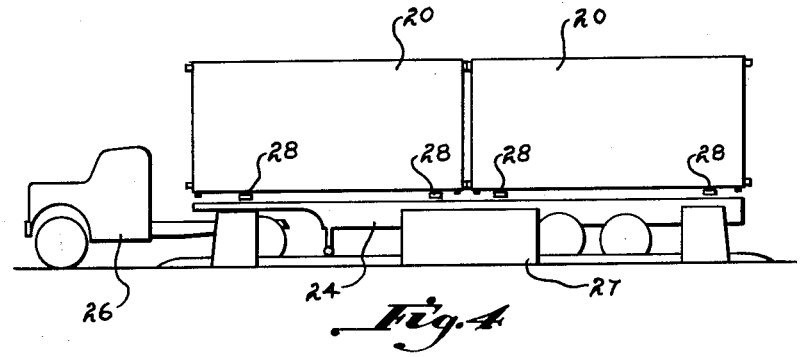
Figure 5:
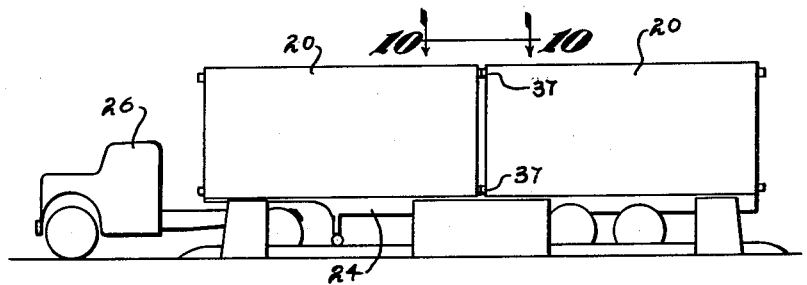

The invention relates to the handling of cargo bodies or boxes of the type indicated at 20 in FIGS. 1 to 5. The cargo bodies 20 may be of a size to be carried by a truck as indicated at 22 in FIGS. 1 and 2 and, through the use of the apparatus described below, to be joined as illustrated in FIGS. 4 and 5 and disposed on the platform of a semi-trailer 24 drawn by a tractor 26 as illustrated in FIG. 5. An understanding of the cargo body handling apparatus can best be obtained by first understanding the sequence of steps which are performed in the handling of the cargo bodies and which are illustrated in FIGS. 1 to 5.

As shown in FIG. 1, a first truck passes, in the direction of the arrows, into cargo body lifting apparatus indicated generally at 27. Four rectangularly spaced lifting devices 28 engage the under surface of the cargo body 20 and lift it from the broken line position on the chassis of the truck 22 to the solid line position. Thereafter the truck is driven out of the handling apparatus 27.

The cargo body 20 is then engaged by rollers indicated at 30 which are rotatable about transverse axes. The rollers 30 permit the cargo body to be shifted in a longitudinal direction and, during the engaging of the rollers with the cargo body, center the cargo body within the apparatus 27. The cargo body may be provided with protuberances 31 at either end to prevent it from rolling off the rollers. After rollers 30 have positioned the cargo body, the lifting devices 28 are lowered.

After the transfer of the cargo body from the lifting devices 28 to the rollers 30, a second cargo body 20 is backed by means of a truck 22 into the handling apparatus 27. The second cargo body is lifted by similar devices 28 and thereafter centered by rollers 30 as indicated in FIG. 3 and thereby aligned with the first cargo body. Lifting devices 28 again are lowered after the cargo body is received by rollers 30.

As stated above, the engagement of the rollers 30 with the cargo bodies effects the centering of the cargo bodies within the handling apparatus 27. The thus aligned cargo bodies are brought together from the position of FIG. 2 to the position of FIG. 3 and rigidly joined together by suitable fastening means as is illustrated in FIGS. 10 and 11 for example. The fastening means may comprise lugs 32 and 33 fixed to the cargo bodies and apertured as at 34 and 35 to receive a tapered pin 36. Alternatively, of course, a threaded nut and bolt could be substituted for the tapered pin 36. The fastening means illustrated best in FIG. 11 is applied as at 37 to the four adjacent corners of the aligned cargo bodies so as to provide a rigid unitary interconnection of the adjoining cargo bodies 20 particularly at the bottom portions thereof.

The thus joined cargo bodies are simultaneously engaged by the lifting means 28 and supported thereby and the rollers 30 are retracted. A semi-trailer 24 is backed within the handling apparatus 27 by the tractor 26 as shown in FIG. 4. When the semi-trailer 24 is substantially aligned with the integrally joined cargo bodies, the lifting mechanisms 28 are lowered to bring the cargo bodies to rest on the upper surface of the semi-trailer chassis.

When the cargo bodies are integrally joined and thereafter disposed upon the semi-trailer chassis, the bending moment arising from the cargo body load is resisted to a major extent by the cargo body structure and particularly at fastening means 37. If it were not for the rigid fastening of the cargo bodies together, the loading of the cargo bodies would be concentrated intermediate the forward and rearward ends of the semi-trailer chassis and would require a much stronger chassis to resist such a load concentration than is required when the cargo bodies are integral.

However by rigidly joining the adjacent corners of the aligned cargo bodies, particularly the bottom corners, a support beam is formed. When the cargo bodies are loaded, the upper adjoining corners are under compression and the lower adjoining corners are under tension. Since the "cargo body beam" assumes a considerable portion of the load, the beam structure of the chassis may be reduced, thereby reducing the height of the chassis platform and permitting the inches and weight saved to be applied to increasing the height of the cargo bodies, and consequently increasing the loading capacity of the cargo bodies.

It should be understood that only an abutting engagement of the upper portions of the cargo bodies is necessary, for the upper portions are in compression when the joined cargo bodies are functioning as a "beam." Accordingly, the upper corners might be provided with a socket engagement while only the bottom corners would be provided with integral fasteners which would resist the tendency of the cargo bodies to separate.

Handling Apparatus

The lifting devices 28 of the handling apparatus are best illustrated in FIGS. 6 and 8. Four lifting devices are rectangularly disposed on either side of a driveway 40, each device comprising a rigid vertical post 41 having a pivot hinge 42 at the upper end thereof. A V-shaped link 43 is pivoted at one end to the pivot hinge 42. The other end of the V-shaped hinge is bifurcated to receive a shaft 44 on which a roller 45 is rotatably mounted. A hydraulic ram 46 has its lower or cylinder end 47 pivoted to the base of the post 41. Its upper or piston end 48 is bifurcated and secured to the shaft 44 so that there is a pivotal connection between the V-shaped link 43 and the ram 46. The ram 46 may be operated by a hydraulic pressure system, for example as in "Method and Apparatus for Handling Cargo Bodies," Serial No. 770,639, filed October 30, 1958, to move the link 43 and roller 45 from a lower portion illustrated in solid lines to a raised position illustrated in broken lines.

Because the line between the pivot axes of the link 43 is downwardly inclined when the ram 46 is retracted and is upwardly inclined when the ram 46 is extended, the rollers 45 of opposed lifting devices move toward each other as the roller is moved from its lowest position toward its upper position. Thus the roller at its lowermost and uppermost positions is transversely retracted so as to provide clearance for the transporting vehicle as it passes into and from the lifting apparatus 27. The use of a roller 45 is valuable in permitting the transverse projection and retraction of the line of engagement of the lifting mechanism with respect to the cargo body but additionally, and perhaps more important, the use of the roller facilitates the centering and aligning of the cargo bodies through the use of transversely projectable rollers 30 to be described in detail below.

The transversely projectable rollers 30 are best illustrated in FIG. 9. Each roller comprises a wheel 50 having a flange 51. The wheel is rotatably mounted on the end of a piston 52 which, with a cylinder indicated at 53, forms a hydraulic ram. The roller assembly is mounted on an extension 54 of the post 41 to which the lift mechanism is mounted. A generally U-shaped bracket 55 bolted to the post extension 54 secures the rearward end of the roller assembly to the post and provides a cantilever support for the rollers when they receive a loaded cargo body. A hydraulic system is used to project the pistons 52 and wheels 50 from the position shown in full lines to the position shown in broken lines. The flanges 51 of the wheels 50 engage the lower longitudinal corners of the cargo body and center the cargo body with respect to the driveway 40. The hydraulic system by which the rollers are projected uniformly may be generally of the type shown in application "Method and Apparatus for Handling Cargo Bodies," Serial No. 770,639, filed October 30, 1958. By referring to FIG. 8, it can be seen that the lift rollers 45 maintain the cargo body, in its upper position, above the supporting surface of the wheel 50 but below the upper circumferential extremity of the flange 51. With this design, as the flanges 51 engage the cargo bodies, the cargo bodies will roll on the rollers 45 until centering is perfected.

After two cargo bodies have been centered, the lift mechanism 28 is retracted so that the cargo bodies are lowered onto the support surface of the wheels 50 as shown in broken lines in FIG. 9. When the two cargo bodies are in their aligned, centered position on the wheels 50 a portable hydraulic device can be applied to draw the cargo bodies together.

It should be understood that the supporting surfaces of the wheels 51 may be conical at at least their forward portions so that as the wheels engage the lower longitudinal rails or corners of a cargo body, the wheels will simultaneously center the cargo body and lift the body off the lifting devices 28 as the cargo body is forced upwardly upon the larger diameter portion of the wheel 51.

As illustrated in FIGS. 6 and 7, a bumper 60 may be disposed on each side of the driveway 10 and between aligned sets of lifting devices and rollers. The bumper may be pivoted to L-shaped brackets 61 mounted on a central section 62 formed between adjoining posts 41 so that it can be swung from a horizontal position as illustrated to a vertical position as shown in broken lines in FIG. 7. The extremity of the bumper is padded with a soft resilient material such as rubber as at 63. The pads 63 will serve to minimize the impact of the cargo bodies as they are backed into the handling apparatus. The bumpers are swung to their vertical positions and thereafter the cargo bodies are brought together and rigidly fastened as illustrated in FIGS. 10 and 11.

It has been indicated that the lifting device 28 and the centering rollers 30 may be operated by a hydraulic system as illustrated in my co-pending application. Preferably the system would be adapted to use with the present invention by operating the eight individual lifting units 28 simultaneously whereas the rollers 30 would be projected and retracted selectively in groups of four. The simultaneous operation of all lifting devices will permit uniform lowering of the integrally joined cargo bodies onto the semi-trailer. On the other hand, selective operation of the rollers 30 in groups of four is necessary, for one group of rollers must be projected to support one of the cargo bodies while the other group of rollers 30 is retracted to permit the passage of the second cargo body into the handling apparatus.

Preferably also, an interlock should be provided to permit retraction of the rollers 30 only when the cargo body is supported by the lifting device 28. Such an interlock would prevent the inadvertent operation of the wrong group of rollers 30 and thus avoid dropping of a cargo body onto the driveway 10.

While there has been disclosed in the above description, what is deemed to be the most practical and efficient embodiment of the invention, it should be well understood that the invention is not limited to such embodiment as there might be changes made in the arrangement, disposition and form of the parts without departing from the principle of the present invention as comprehended within the scope of the accompanying claims.

Having described my invention, I claim:

1. Apparatus for handling cargo bodies comprising, a driveway for the passage of trucks and tractor drawn semi-trailers, two lift means disposed at aligned adjacent positions on both sides of said driveway, said lift means adapted to move a cargo body to raised and lowered positions, supports positioned adjacent each said lift means, horizontally movable rollers mounted on said supports, means for projecting said rollers transversely toward said driveway to engage the lower longitudinal corners of cargo bodies in raised positions to permit said cargo bodies to be rolled toward each other, and bumper means located between said lift means and swingable into and out of the path of said cargo bodies.

2. Apparatus for handling cargo bodies comprising, a driveway for the passage of trucks and tractor drawn semi-trailers, two lift means having rollers mounted on longitudinal shafts and disposed at aligned adjacent positions on both sides of said driveway, said lift means adapted to engage said rollers with the under surface of a cargo body to move a cargo body to raised and lowered positions, supports positioned adjacent each said lift means, horizontally movable rollers mounted on transverse shafts on said supports, and means for projecting said horizontally movable rollers transversely toward said driveway to engage the undersurface of cargo bodies in raised positions to permit said cargo bodies to be rolled toward each other.

3. Apparatus for handling cargo bodies comprising, a driveway for the passage of trucks and tractor drawn semi-trailers, two lift means disposed at aligned adjacent positions on both sides of said driveway, said lift means adapted to move a cargo body to raised and lowered positions, supports positioned adjacent each said lift means, horizontally movable rollers mounted on said supports, and means for projecting said rollers transversely toward said driveway to engage the under surface of cargo bodies in raised positions to permit said cargo bodies to be rolled toward each other.

4. Apparatus for handling cargo bodies comprising, a driveway for the passage of trucks and tractor drawn semi-trailers, two hydraulic rams disposed at aligned adjacent positions on both sides of said driveway, said rams having rollers rotatable about longitudinal axes and engageable with the under surface of cargo bodies, said rams being adapted to move a cargo body to raised and lowered positions, supports positioned adjacent each said rams, horizontally movable rollers mounted on said supports, and means for projecting said horizontally movable rollers transversely towarrd said driveway to engage the under surface of cargo bodies in raised positions to permit said cargo bodies to be rolled toward each other.

5. Apparatus for handling cargo bodies comprising, a driveway for the passage of trucks and tractor drawn semi-trailers, two lift means disposed at aligned adjacent positions on both sides of said driveway, said lift means adapted to engage a cargo body to move a cargo body to raised and lowered positions, supports positioned adjacent each said lift means, horizontally movably rollers mounted on transverse shafts on said supports, and means for projecting said horizontally movable rollers transversely toward said driveway to engage and position the cargo body centrally of the driveway and to allow the cargo body to rest on said rollers when said lift means is lower whereby said cargo bodies can be rolled toward each other.

References Cited in the file of this patent

UNITED STATES PATENTS

| | | |
|---|---|---|
| 444,227 | Tiffany | Jan. 6, 1891 |
| 1,122,686 | Clark et al. | Dec. 29, 1914 |
| 1,591,656 | Callison | July 6, 1926 |
| 2,069,236 | Fitch | Feb. 2, 1937 |
| 2,186,854 | Auger et al. | Jan. 9, 1940 |
| 2,379,094 | Maxon | June 26, 1945 |
| 2,447,559 | Bloemers | Aug. 24, 1948 |
| 2,451,226 | Kemp | Oct. 12, 1948 |
| 2,538,531 | Likens | Jan. 16, 1951 |
| 2,652,915 | Fox | Sept. 22, 1953 |
| 2,714,967 | Olsen | Aug. 9, 1955 |
| 2,808,289 | Scoby | Oct. 1, 1957 |
| 2,818,954 | Vice | Jan. 7, 1958 |
| 2,868,401 | Lelois | Jan. 13, 1959 |